US008740175B2

(12) United States Patent
Kawamura et al.

(10) Patent No.: US 8,740,175 B2
(45) Date of Patent: Jun. 3, 2014

(54) FILLING CHANNEL OPENING AND CLOSING DEVICE FOR LIQUID PRODUCT FILLING APPARATUS

(75) Inventors: Kenji Kawamura, Iwakuni (JP); Namiyoshi Tanaka, Iwakuni (JP); Hideo Muranaka, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 314 days.

(21) Appl. No.: 13/018,048

(22) Filed: Jan. 31, 2011

(65) Prior Publication Data

US 2011/0186757 A1 Aug. 4, 2011

(30) Foreign Application Priority Data

Feb. 1, 2010 (JP) ................................. 2010-019984
Apr. 26, 2010 (JP) ................................. 2010-101277

(51) Int. Cl.
*F16K 7/07* (2006.01)
*F16K 23/00* (2006.01)
*F16K 31/128* (2006.01)

(52) U.S. Cl.
USPC ................. 251/5; 251/61.1; 251/45; 251/342

(58) Field of Classification Search
USPC ........ 251/4, 5, 61.1, 45, 342; 137/551, 15.11, 137/312, 486, 559, 624.11, 624.12, 853; 222/212, 214
See application file for complete search history.

(56) References Cited

U.S. PATENT DOCUMENTS

| | | | | |
|---|---|---|---|---|
| 2,884,963 | A * | 5/1959 | Erndt | 141/51 |
| 3,143,124 | A * | 8/1964 | Todd | 137/13 |
| 3,561,723 | A * | 2/1971 | Cugini | 251/1.2 |
| 4,199,279 | A * | 4/1980 | Himeji et al. | 405/303 |
| 4,403,764 | A * | 9/1983 | Repplinger | 251/5 |
| 4,866,633 | A * | 9/1989 | Nakane et al. | 700/282 |
| 4,967,940 | A * | 11/1990 | Blette et al. | 222/214 |
| 5,107,883 | A * | 4/1992 | Shaw | 137/357 |
| 5,161,773 | A * | 11/1992 | Tower | 251/5 |
| 5,549,793 | A * | 8/1996 | Hellstrom et al. | 162/258 |
| 5,797,415 | A * | 8/1998 | Nicholson et al. | 137/15.01 |
| 5,799,227 | A * | 8/1998 | Matheis et al. | 399/92 |
| 6,178,989 | B1 * | 1/2001 | Windschmitt et al. | 137/312 |
| 6,572,259 | B2 * | 6/2003 | Burnett et al. | 366/191 |

FOREIGN PATENT DOCUMENTS

| | | | |
|---|---|---|---|
| JP | 3454875 | B | 10/2003 |
| JP | 3704270 | B | 10/2005 |
| JP | 2008-94496 | A | 4/2008 |
| JP | 2009-234633 | A | 10/2009 |

* cited by examiner

*Primary Examiner* — Atif Chaudry
(74) *Attorney, Agent, or Firm* — DLA Piper LLP (US)

(57) ABSTRACT

A filling channel opening and closing device, which is used in a liquid product filling apparatus, including an opening and closing control unit that includes a flexible tube and a chamber enclosing the flexible tube in a gastight manner, a gas supply and exhaust device that collapses and restores the flexible tube by supplying pressurized gas into the chamber and exhausting the gas from the chamber, and a control device that controls the timing of supply and exhaust of the gas of the gas supply and exhaust device.

1 Claim, 10 Drawing Sheets

FILLING CHANNEL OPENING AND CLOSING DEVICE FOR LIQUID PRODUCT FILLING APPARATUS

BACKGROUND OF THE INVENTION

1. Field of the Invention

The present invention relates to a filling channel opening and closing device that opens and closes a filling channel at a predetermined timing in a liquid product filling apparatus used to fill containers with liquid product supplied from a liquid product storage tank and more particularly to a filling channel opening and closing device that opens and closes a filling channel by collapsing with an external force a flexible tube installed as part of the filling channel and causing it to restore.

2. Description of Related Art

Japanese Patent Nos. 3704270 and 3454875 and Japanese Patent Application Laid-Open (Kokai) Nos. 2008-94496 and 2009-234633 disclose filling channel opening and closing devices. In these devices, a flexible tube made of an elastic material is installed in a filling channel, as part of this filling channel so that it is located between a liquid product storage tank and the discharge orifice of a filling nozzle (including a filling nozzle), and a rigid pressing member, which advances and retracts by a driving source, is disposed in the vicinity of the flexible tube. In such a filling channel opening and closing device, the driving source causes the pressing member to advance to apply pressure to the flexible tube, thereby collapsing the flexible tube to close the filling channel at the flexible tube portion. On the other hand, when the filling channel is to be opened, the pressing member is retracted and separated from the flexible tube, thus causing the flexible tube to restore (to its original shape) to open the filling channel. It these operations, the restoring of the flexible tube takes place under the action of the pressure of the liquid inside the filling channel (or inside the flexible tube) and the restoring force of the flexible tube itself (if it is formed from an elastic material).

In the filling channel opening and closing devices described above, the direct contact and separation of the pressing member with respect to the flexible tube is repeated whenever the filling channel is opened and closed (during each filling operation), and this results in considerable localized wear in the flexible tube at the location(s) of contact. For this reason, it is necessary to replace the flexible tube frequently, which is problematic in terms of cost and imposes a heavy burden on the operator. In addition, the wear of the flexible tube results in, among others, contamination, creating problems in terms of its cleaning and maintenance properties.

SUMMARY OF THE INVENTION

Therefore, it is an object of the present invention to provide a filling channel opening and closing device in which the durability of the flexible tube is increased by alleviating localized wear, thus decreasing the cost and burden imposed on the operator while improving its cleaning and maintenance properties.

The above object is accomplished by unique structures of the present invention for a filling channel opening and closing device that is used in a liquid product filling apparatus in which the filling channel opening and closing device includes a flexible tube that is installed as part of a filling channel provided between a liquid product storage tank and a discharge orifice of a filling nozzle, so that the opening and closing device closes and opens the filling channel by collapsing and restoring the flexible tube with an external force, and in the present invention, this opening and closing device is comprised of:

- a filling channel opening and closing control unit that includes the flexible tube and a chamber which encloses a periphery of the flexible tube in a gastight manner;
- a gas supply and exhaust means that is connected to the opening and closing control unit and collapses and restores the flexible tube by supplying pressurized gas into the chamber and then exhausting the gas from the chamber; and
- a control means that controls the gas supply and exhaust means to supply and exhaust the gas in and out of the chamber at a predetermined timing.

In this structure, a gas exhaustion by the gas supply and exhaust means is releasing of the gas from the chamber into the atmosphere or a reducing of the pressure inside the chamber (which is an installation of, for instance, a pressure-reducing means, such as a vacuum pump). In addition, the flexible tube is preferably cylindrical in shape and is made from an elastic material, such as silicone rubber, etc.

In the above described structure, if the pressure of the pressurized gas supplied into the chamber of the filling channel opening and closing control unit is sufficiently high, the flexible tube is collapsed under uniform pressure applied from the outside or external force which is pressurized gas, thereby closing the filling channel at the flexible tube portion. On the other hand, when the pressurized gas is exhausted from the chamber, the pressure of the liquid inside the filling channel, along with the elastic restoring force of the flexible tube and, secondarily, the reduced pressure inside the chamber, causes the flexible tube to be restored (or to expand) to its original tubular shape, thus opening the filling channel.

It should be noted that the term “liquid product” used in the description of the present specification includes not only liquids but also mixtures of solid matter and liquids.

The following structures can be suggested as examples of more specific embodiments of the above-described filling channel opening and closing device.

(1) The chamber is substantially cylindrical in shape, a gastight compartment is formed between the outer peripheral surface of the flexible tube and the inner surface of the chamber, and pressurized gas is supplied into this gastight compartment and exhausted from the gastight compartment.

(2) In the filling channel opening and closing control unit, the chamber has retaining sections that tightly adhere to the entire perimeter of the outer peripheral surface of both ends of the flexible tube at the front (upstream side) and back (downstream side) of the gastight compartment, and hollow inner pieces that form part of the filling channel are disposed on the inner diameter side of the retaining sections at a predetermined spacing. The inner pieces are fitted into both (starting and ending) ends of the flexible tube and tightly adhere to the entire perimeter of the inner peripheral surface of the tube, and both ends of the flexible tube, which are sandwiched by the retaining sections of the chamber and the inner pieces, are held in a predetermined position.

(3) Two opening and closing control units can be provided in series in the filling channel. In this structure, the gas supply and exhaust means is connected to each one of the opening and closing control units. After supplying pressurized gas into the chambers of the two opening and closing control units at the end of the filling operation (of the liquid product into, for instance, a bag), the gas is exhausted from the chamber of the downstream side opening and closing control unit at a predetermined timing. This two control unit structure permits suck-back of the liquid product to occur after the filling operation.

(4) The gas supply and exhaust means can switch the pressure level of the pressurized gas supplied into the chamber in two levels: a high (first) pressure, which closes the filling channel by collapsing the flexible tube, and a low (second) pressure, which is lower than the high (first) pressure. After supplying pressurized gas into the chamber at the high-pressure (first pressure) level at the end of the filling operation, the gas supply and exhaust means switches over to the low-pressure (second pressure) level at a predetermined timing. In this case, the pressure of the low-pressure (second pressure) pressurized gas can be set to a level at which the flexible tube remains in the collapsed state (so that the filling channel is kept in a closed state). Alternatively, the pressurized gas can be set to a level at which the flexible tube is incompletely collapsed (so that the filling channel is not kept in a closed state). In either case, this two pressure level setting permits suckback to occur after the filling operation.

(5) A gas flow meter can be installed as part of the gas supply and exhaust means in a pressurized gas supply duct that is provided in communication with the chamber. The gas flow meter measures the flow rate of the pressurized gas when the pressurized gas is being supplied into the chamber, and the control means uses the measurements from the flow meter to make a determination of any presence of leak of the pressurized gas in the chamber.

(6) The chamber can be made of a transparent (translucent) material, such as acrylic resin, etc.

(7) A detection sensor that detects leakage of the liquid product can be installed in the gastight compartment of the chamber.

As seen from the above, in the filling channel opening and closing device of the present invention, a flexible tube installed inside a filling channel opening and closing control unit is collapsed under uniform pressure applied by a pressurized gas. Consequently, the flexible tube is not subjected to localized wear at the location(s) of contact with a pressing member, unlike prior-art devices, in which the flexible tube is collapsed by a rigid pressing member. Thus, according to the present invention, it is possible to increase the durability of the flexible tube and its useful life, it is possible to decrease the frequency of replacement of the flexible tube so as to reduce the cost and operator's burden, and it is also possible to improve the cleaning and maintenance properties of the filling channel opening and closing device.

DETAILED DESCRIPTION OF THE INVENTION

The filling channel opening and closing device of the present invention for a liquid product filling apparatus will be described below more specifically with reference to the accompanying drawings including FIGS. 1 through 10.

Figure 1:
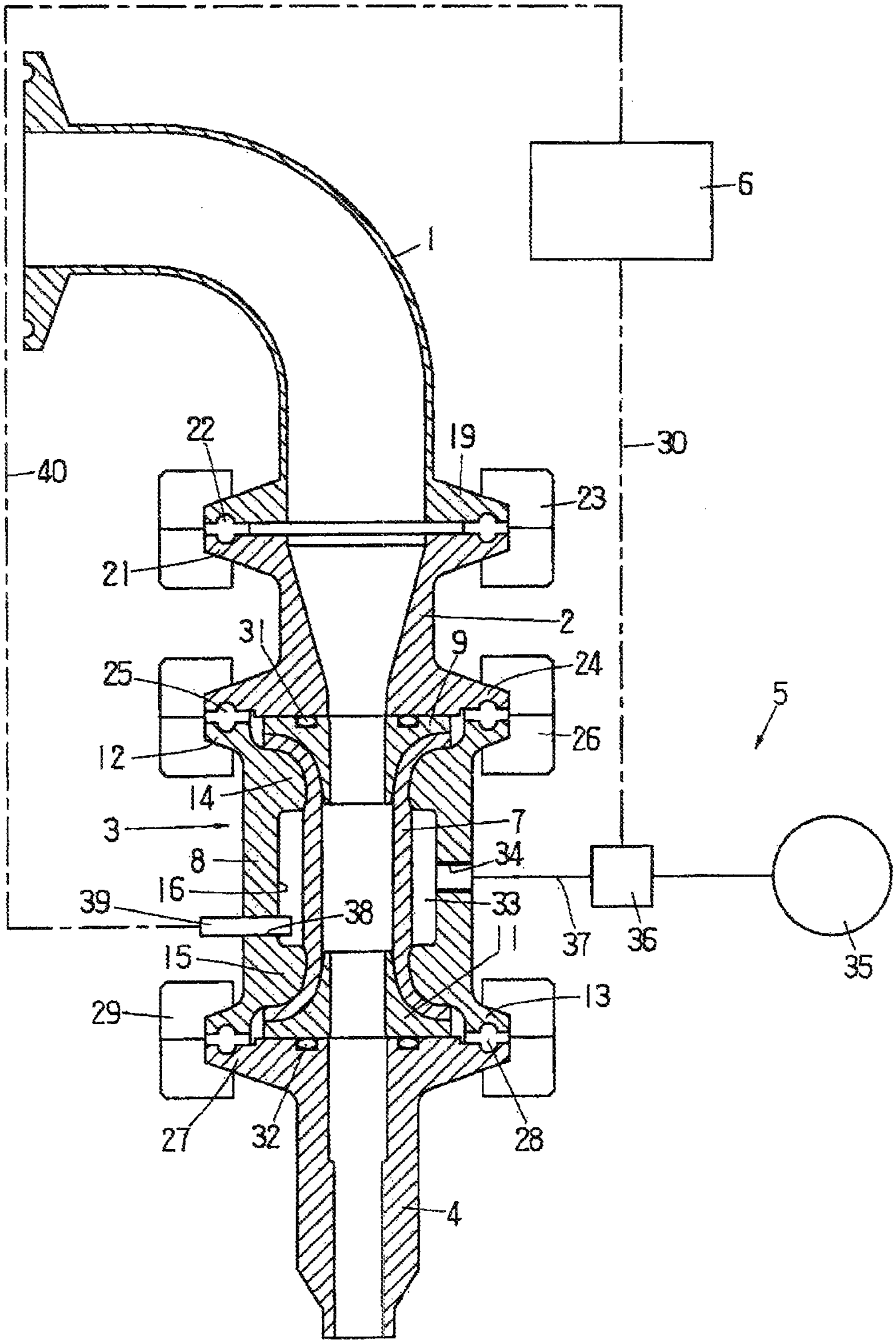
FIG. 1 is a vertical cross-sectional view of a filling channel opening and closing device according to the present invention (with pressurized gas exhausted from chamber)

The liquid product filling apparatus illustrated in FIG. 1 includes, among others, an elbow duct 1, which is placed in communication with a liquid product storage tank (not shown) with either a filling channel (not shown) in between or nor such filling channel in between; a straight duct 2, which is disposed at the lower end of the elbow duct 1; a filling channel opening and closing control unit 3, which is disposed at the lower end of the straight duct 2; a filling nozzle 4, which is disposed at the lower end of the opening and closing control unit 3; a gas supply and exhaust means 5, which is connected to the opening and closing control unit 3; a control means 6, which controls the gas supply and exhaust means 5. Accordingly, in FIG. 1, the filling channel is formed with the elbow duct 1, the straight duct 2, the filling channel opening and closing control unit 3, and the filling nozzle 4.

Figure 2:
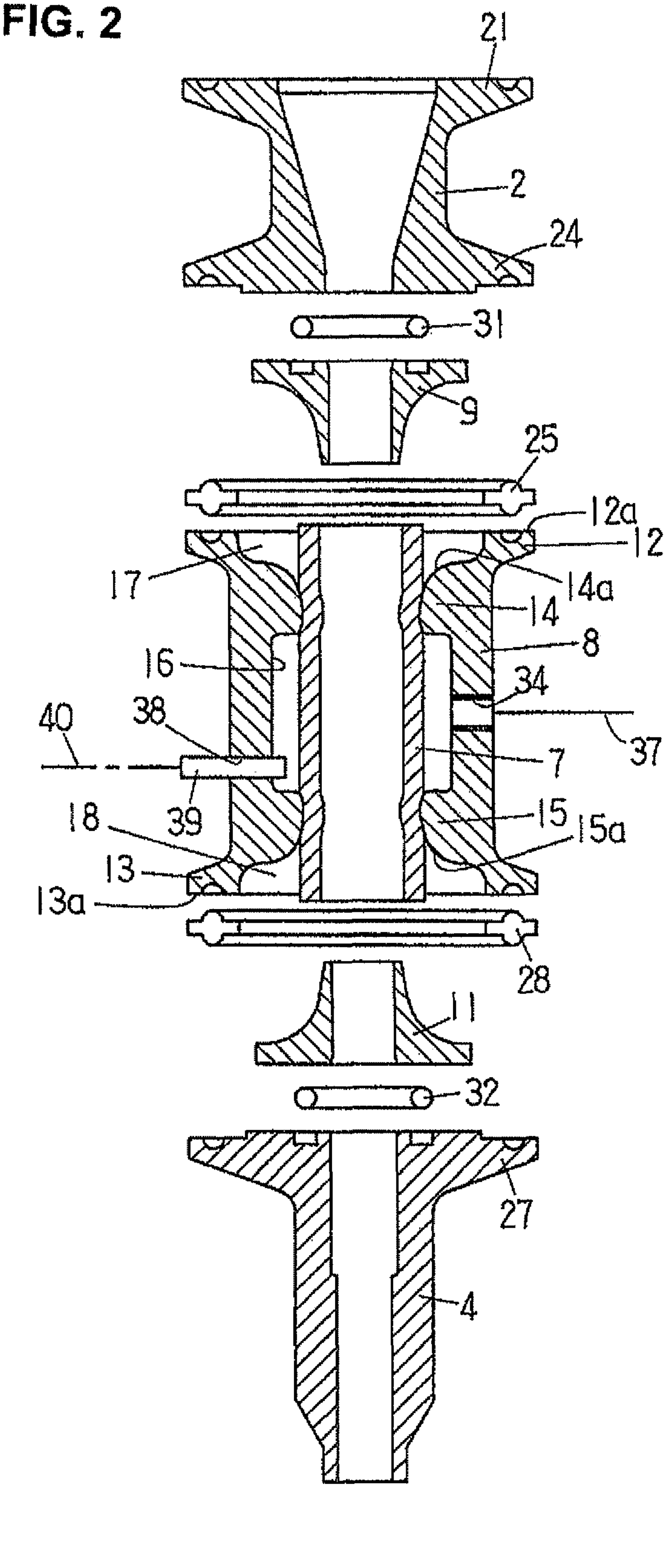
FIG. 2 is a cross-sectional exploded view of the filling channel opening and closing device of FIG. 1 including the filling nozzle.

As shown in FIGS. 1 and 2, the opening and closing control unit 3 is comprised of a cylindrical flexible tube 7 formed, for instance, of silicone rubber, a chamber 8 in a substantially cylindrical shape and enclosing (the periphery of) the flexible tube 7 therein, and inner pieces 9 and 11 disposed respectively on the inner diameter side of the upper and lower ends of the chamber 8.

Flanges 12 and 13 are respectively formed at both ends of the chamber 8 for joining it to the straight duct 2 and to the filling nozzle 4. Retaining sections 14 and 15, which protrude inwardly in an annular configuration, are formed on the inner peripheral surface near both upper and lower ends of the chamber 8, and a cylindrical central recess 16 is formed between the retaining sections 14 and 15 (so as to be in the central portion of the inner periphery of the chamber 8). In addition, as seen from FIG. 2, upper and lower recesses 17 and 18 are formed respectively on the inner diameter side (or inside) of the flanges 12 and 13 (so that the upper recess 17 is between the end face 12*a* of the flange 12 and the retaining section 14, and the lower recess 18 is between the end face 13*a* of the flange 13 and the retaining section 15). The inner diameter of each one of the retaining sections 14 and 15 is substantially the same as the outer diameter of the flexible tube 7, and the inner peripheral surfaces 14*a* and 15*a* at both ends of the retaining sections 14 and 15 are convexly curved to an expanded diameter. The central recess 16 is formed such that its inner diameter is greater than the outer diameter of the flexible tube 7.

The overall configuration of each one of the inner pieces 9 and 11 is substantially frusto-conical and annular, and the outer peripheral surface of each of the inner pieces is concavely curved to an expanded diameter in a shape that substantially follows the inner peripheral surface of each one of the retaining sections 14 and 15 of the chamber 8.

The assembly of the elbow duct 1, straight duct 2, opening and closing control unit 3, and filling nozzle 4 is made as described below.

The flange 19, which is formed at the lower end of the elbow duct 1, and the flange 21, which is formed at the upper end of the straight duct 2, are connected to each other using a clamp 23 with a gasket 22 therebetween.

In the opening and closing control unit 3, the flexible tube 7 is placed in the chamber 8, and the inner pieces 9 and 11 are fitted, head having a smaller diameter first, into both ends of the flexible tube 7. With the flexible tube 7 thus inside the chamber 8 along with the innerpieces 9 and 11, the flange 24, which is formed at the lower end of the straight duct 2, and the flange 12 of the chamber 8 are connected to each other using a clamp 26, with a gasket 25 therebetween; and the flange 13 of the chamber 8 and the flange 27 formed at the upper end of the filling nozzle 2 are connected to each other using a clamp 29 with a gasket 28 therebetween.

In the thus assembled opening and closing control unit 3, the inner pieces 9 and 11 are respectively fitted into the recesses 17 and 18 at both ends of the chamber 8. The (upper) inner piece 9 and the end face of the flange 24 of the straight duct 2 press against each other, with an O-ring 31 interposed therebetween. The (lower) inner piece 11 and the end face of the flange 27 of the filling nozzle 2 also press against each other, with another O-ring 32 sandwiched in between.

In addition, the upper end of the flexible tube 7 is sandwiched in a compressed state between the retaining section 14 of the chamber 8 and the inner piece 9, and lower end of the tube 7 is also sandwiched in a compressed state between the retaining section 15 of the chamber 8 and the inner piece 11. As a result, the flexible tube 7 is held in a predetermined position inside the chamber 8; and at the same time, the entire perimeters of the outer peripheral surfaces of both ends of the flexible tube 7 are closely adhered to the inner peripheral surfaces of the retaining sections 14 and 15 of the chamber 8; and the inner peripheral surfaces of the tube 7 are closely adhered to the outer peripheral surfaces of the inner pieces 9 and 11 throughout the entire perimeter. As a result, leakage of the liquid product between the inner pieces 9 and 11 and the flexible tube 7 is prevented; and in addition, a cylindrical gastight compartment 33 is formed in the chamber 8 so that it is between the recess 16 of the chamber 8 and the outer peripheral surface of the flexible tube 7. In addition, since both ends of the flexible tube 7 are sandwiched respectively between the retaining sections 14 and 15 and the inner pieces 9 and 11 in a flared configuration, the flexible tube 7 is held firmly, and it is less susceptible to misalignment.

For this opening and closing control unit 3, a gas supply/exhaust port 34 which communicates with the gastight compartment 33 is formed in the side wall of the chamber 8. A gas supply and exhaust means 5, which includes a pressurized gas supply source 35, a changeover valve 36, a duct 37, etc., is connected to the gas supply/exhaust port 34. The changeover valve 36 switches the gas supply/exhaust port 34 to the pressurized gas supply source 35 side or to the atmosphere for gas release. Furthermore, an opening 38, which communicates with the gastight compartment 33, is formed in the side wall of the chamber 8, and a detection sensor 39, which detects liquid product leakage through the opening 38, is installed in the gastight compartment 33. The operation of the changeover valve 36 is controlled by the control means 6 through wiring 30, and the detected signals from the detection sensor 39 are sent to the control means 6 through wiring 40.

The filling channel opening and closing device according to the present invention is thus comprised of the opening and closing control unit 3, the gas supply and exhaust means 5, the control means 6, the detection sensor 39, etc.

In the liquid product filling apparatus described above, the liquid product stored in the liquid product storage tank (not shown) is forced into the filling channel by an appropriate pressure-applying means, such as, a gravity-based means that utilizes the potential energy of the liquid product inside the tank (as disclosed in the above-described Japanese Patent Nos. 3704270 and 3454875), a pressurized tank-type means in which the tank is pressurized using air pressure, and a pump-based means in which the liquid product is pumped out by applying pressure with a pump provided in the filling channel. After passing through the elbow duct 1, straight duct 2, inner piece 9, flexible tube 7, inner piece 11, and filling nozzle 4, the liquid product exits from the discharge orifice of the filling nozzle 4 into a container (not shown) which is set underneath the filling nozzle 4. In addition, the detection of the quantity of the liquid product discharged in a single filling operation can be carried out with a measuring means such as the flow meter described in the Japanese Patent No. 3454875 and the Japanese Patent Application Laid-Open (Kokai) No. 2009-234633, both described above. In addition, the liquid product filling apparatus may include a measuring pump (which includes a metering cylinder and a piston) in the filling channel so that it pumps out a predetermined amount of liquid product measured thereby at each time of feeding (of the liquid product).

In the above-described liquid product filling apparatus, one cycle of filling channel opening and closing control of the filling channel opening and closing device of the present invention is carried out as follows:

(1) Before Filling

Figure 3:
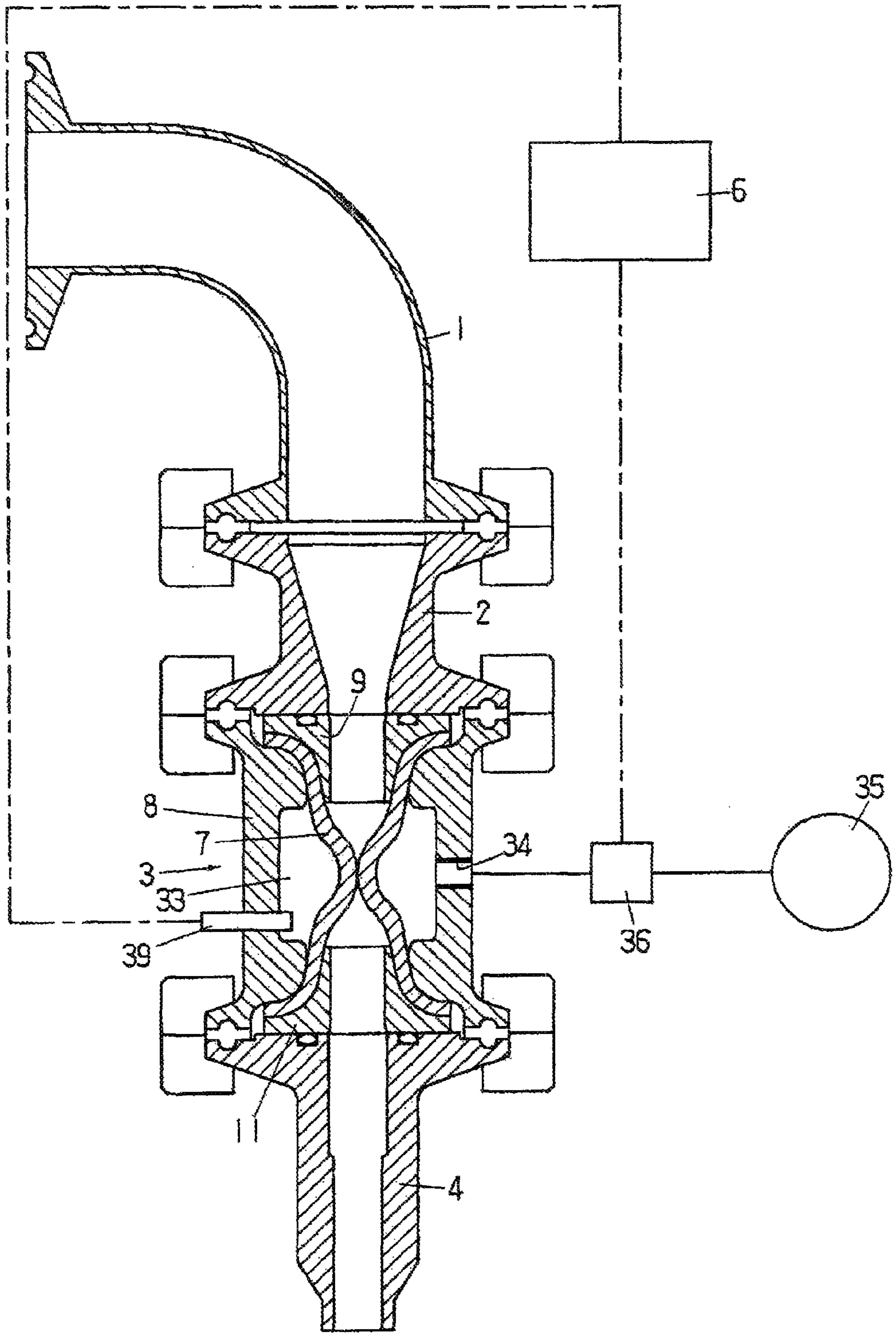
FIG. 3 is a vertical cross-sectional view of the filling channel opening and closing device of FIG. 1 (with pressurized gas supplied in the chamber)

By the direction of the control means 6, the changeover valve 36 places the gas supply/exhaust port 34 in communication with the pressurized gas supply source 35, so that the gastight compartment 33 in the chamber 8 is pressurized by the pressurized gas supplied from the pressurized gas supply source 35, and thus, as shown in FIG. 3, the flexible tube 7 collapses under outside pressure (or by external force which is the pressurized gas), thereby closing the filling channel at the flexible tube portion 7.

(2) Start Filling

When another empty container is moved to under the discharge orifice of the filling nozzle 4 and held stationary, the control means 6 directs the changeover valve 36 to switch to the atmosphere for gas release and place the gas supply/exhaust port 34 in communication with the atmosphere for gas release. The gastight compartment 33 is, as a result, brought to atmospheric pressure and, as shown in FIG. 1, the restoring force of the flexible tube 7, which is made of an elastic material, as well as the pressure of the liquid product in the filling channel, cause the flexible tube 7 to restore and expand to its original shape, and the filling channel becomes open. As a result, the container (not shown) located underneath the discharge orifice of the filling nozzle 4 is filled with the liquid product that has passed through the flexible tube 7.

(3) Stop Filling

Upon receiving a signal from a flow meter or other dispensed quantity measuring means, the control means 6 issues a changeover command to the changeover valve 36. The changeover valve 36 switches to the pressurized gas supply source 35 side, and the gas supply/exhaust port 34 is placed in communication with the pressurized gas supply source 35. The gastight compartment 33 in the chamber 8 is thus pressurized and, as shown in FIG. 3, the flexible tube 7 collapses, and the filling channel is closed, thus returning the state of (1) above. In this case, the pressure of the pressurized gas supplied to the chamber 8 from the pressurized gas supply source 35 is greater than the pressure of the liquid product inside the flexible tube 7. Next, the filled container is moved away from under the discharge orifice of the filling nozzle 4.

As seen from the above, the above-described filling channel opening and closing device has the following advantages:

(1) Since the flexible tube 7 is collapsed by the pressurized gas in a non-contact fashion, the wear of the flexible tube is prevented, making it possible to increase its durability and reduce the frequency of part replacement. Furthermore, the construction of the entire device is simplified, and its cleaning and maintenance properties are improved.

(2) The flexible tube 7 is held in place (with no tools needed) by simply inserting the flexible tube 7 into the chamber 8 and fitting the inner pieces 9 and 11 into both ends of the flexible tube 7. Accordingly, the attachment and replacement of the flexible tube 7 is carried out easily.

(3) The detection sensor 39 for detecting liquid product leakage is provided. This detection sensor 39 permits automatic detection of any liquid product leaked into the gastight compartment 33 of the chamber 8 due to, for instance, ruptures in the flexible tube 7. Accordingly, a signal is sent to the control means 6, and the control means 6 stops the operation of the liquid product filling apparatus and/or it notifies the operator by generating an audible alert and/or displaying a warning.

Figure 4:
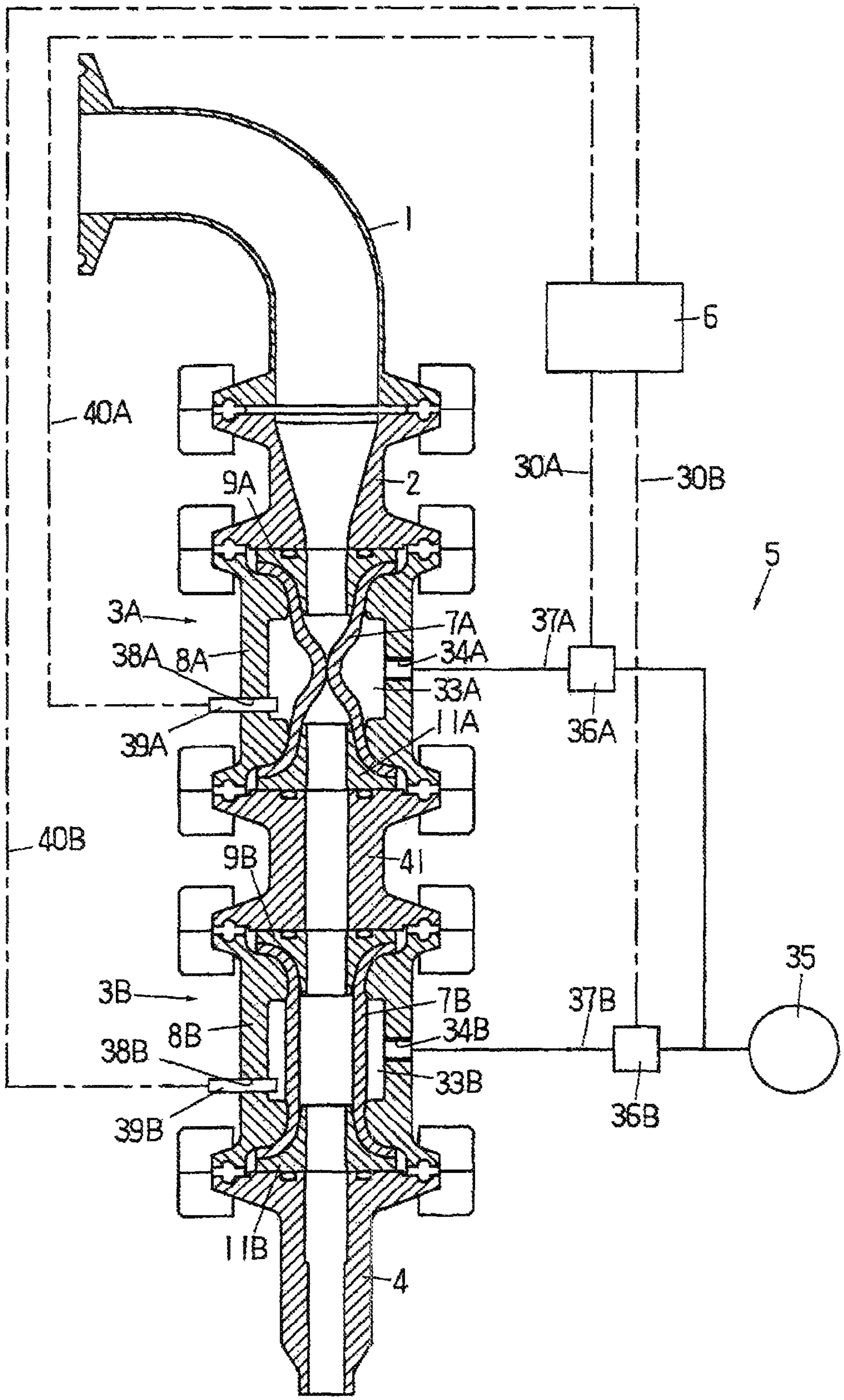
FIG. 4 is a vertical cross-sectional view of another filling channel opening and closing device according to the present invention.

FIG. 4 illustrates another liquid product filling apparatus including the filling channel opening and closing device according to the present invention. This opening and closing device of FIG. 4 has a suckback feature. In FIG. 4, the parts that are substantially identical to the liquid product filling apparatus illustrated in FIG. 1 are assigned the same reference numerals.

The difference of this filling channel opening and closing device illustrated in FIG. 4 from the device of FIG. 1 is that two opening and closing control units 3A and 3B are provided in series with a straight duct 41 in between. The upstream side opening and closing control unit 3A is connected to the lower end of the straight duct 2, and its lower end is connected to the upper end of the straight duct 41. The downstream side opening and closing control unit 3B has its upper end connected to the lower end of the straight duct 41, and its lower end is connected to the upper end of the filling nozzle 4. The opening and closing control units 3A and 3B are controlled independently of each other.

More specifically, the filling channel opening and closing device illustrated in FIG. 4 is comprised of the opening and closing control units 3A and 3B, a gas supply and exhaust means 5, a control means 6, detection sensors 39A and 39B, etc. The gas supply and exhaust means 5 has ducts 37A and 37B and two changeover valves 36A and 36B, which are provided in parallel. Each one of the opening and closing control units 3A and 3B has the same construction as the opening and closing control unit 3 illustrated in FIG. 1. The opening and closing control unit 3A is comprised of a flexible tube 7A, a chamber 8A, and inner pieces 9A and 11A. The opening and closing control unit 3B is comprised of a flexible tube 7B, a chamber 8B, and inner pieces 9B and 11B. The changeover valves 36A and 36B, which are identical to the changeover valve 36 illustrated in FIG. 1, are respectively connected to the gas supply/exhaust ports 34A and 34B of the chambers 8A and 8B. Detection sensors 39A and 39B, which are the same as the detection sensor 39 illustrated in FIG. 1, are respectively connected to the openings 38A and 38B of the chambers 8A and 8B. The changeover valves 36A and 36B are in communication with a shared pressurized gas supply source 35. The operation of the changeover valves 36A and 36B is controlled independently by the control means 6 through wirings 30A and 30B.

One cycle of filling channel opening and closing control of the filling channel opening and closing device illustrated in FIG. 4 is carried out as follows:

(1) Before Filling

By the direction of the control means 6, the changeover valve 36A places the gas supply/exhaust port 34A in communication with the pressurized gas supply source 35 and the changeover valve 36B places the gas supply/exhaust port 34B in communication with the atmosphere for gas release. As a result, as shown in FIG. 4, the gastight compartment 33A in the chamber 8A is pressurized, and the flexible tube 7A therein collapses under outside pressure (or by external force), thereby closing the filling channel at the flexible tube portion 7A. On the other hand, the gastight compartment 33B in the chamber 8B is at atmospheric pressure, and the flexible tube 7B is in a restored state, thereby the filling channel is being opened.

(2) Start Filling

When another empty container is moved to under the discharge orifice of the filling nozzle 4 and held stationary, the control means 6 directs the changeover valve 36A to switch to the atmosphere, and the gas supply/exhaust port 34A of the chamber 8A is placed in communication with the atmosphere for gas release. The gastight compartment 33A is, as a result, brought to atmospheric pressure, and the restoring force of the flexible tube 7A, which is made of an elastic material, as well as the pressure of the liquid product in the filling channel, cause the flexible tube 7A to restore and expand, and the filling channel becomes open, and the filling of the container with the liquid product begins.

(3) Stop Filling

Upon receiving a signal from a flow meter or other dispensed quantity measuring means, the control means 6 issues a changeover command to the changeover valves 36A and 36B. The changeover valves 36A and 36B switch to the pressurized gas supply source 35 side and the gas supply/exhaust ports 34A and 34B are placed in communication with the pressurized gas supply source 35. The gastight compartments 33A and 33B in the chambers 8A and 8B are pressurized, and both flexible tubes 7A and 7B collapse, thereby closing the filling channel.

(4) Suckback

Next, the filled container is moved away from under the discharge orifice of the filling nozzle 4 and, at an appropriate timing before and after thereof, the control means 6 issues a changeover command to the changeover valve 36B. Since only the changeover valve 36B is switched to the atmosphere and the gas supply/exhaust port 34B is placed in communication with the atmosphere for gas release, the flexible tube 7B in the downstream side chamber *8b* is restored or becomes open under the action of the restoring force of the flexible tube 7B, which is illustrated in. FIG. 4. As a result, the volume of the filling channel in the flexible tube 7B expands, and the portion of the filling channel between the flexible tube 7B and the discharge orifice of the filling nozzle 4 is placed under negative pressure. As a result, the liquid product at the vicinity of the discharge orifice of the filling nozzle 4 is sucked back into the filling nozzle 4 (this is called the suckback phenomenon), so that dripping of the liquid product from the discharge orifice of the filling nozzle 4 when the filling operation ends is prevented.

Figure 5:
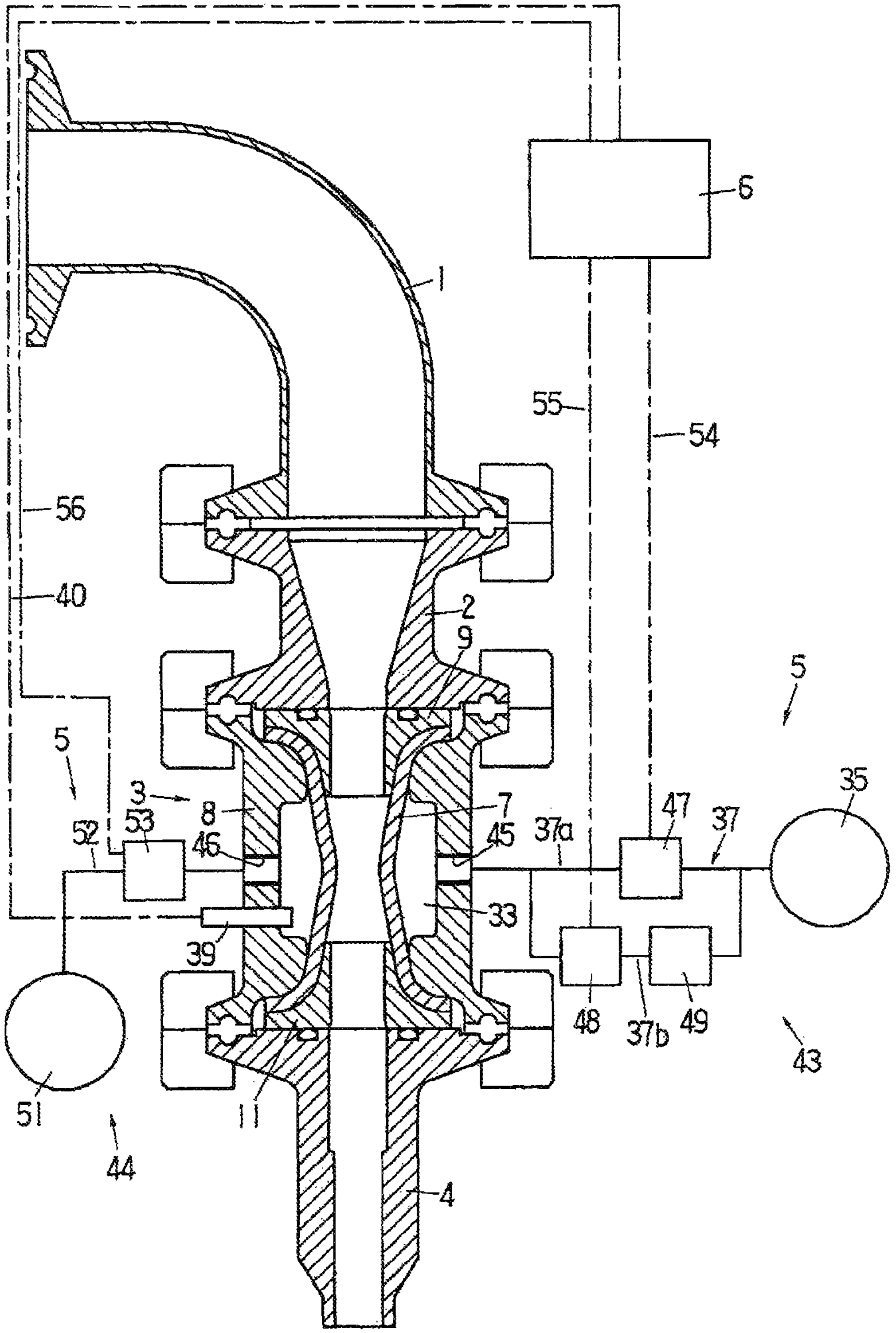
FIG. 5 is a vertical cross-sectional view of yet another filling channel opening and closing device according to the present invention.

FIG. 5 illustrates still another liquid product filling apparatus including the filling channel opening and closing device according to the present invention. In FIG. 5, the parts that are substantially identical to the liquid product filling apparatus illustrated in FIG. 1 are assigned the same reference numerals.

In this filling channel opening and closing device for a liquid product filling apparatus of FIG. 5, the gas supply and exhaust means 5 is comprised of a gas supply device 43 and a gas exhaust means 44, and a gas supply port 45 and a gas exhaust port 46 are formed in the chamber 8. This is the difference of this filling channel opening and closing device illustrated in FIG. 5 from the filling channel opening and closing, device of FIG. 1.

As seen from FIG. 5, the gas supply device 43 is comprised of a pressurized gas supply source 35, ducts 37 (including parallel ducts 37*a* and 37*b*) which are parallel to each other between the pressurized gas supply source 35 and the gas supply port 45, a changeover valve 47 installed in the parallel duct 37*a*, and a changeover valve 48 and a pressure regulating valve (pressure reducing valve) 49 both installed in the parallel duct 37*b*. The gas exhaust means 44 is comprised of a vacuum pump 51, a duct 52 installed between the vacuum pump 51 and the gas exhaust port 46, and a changeover valve 53 installed in the duct 52. The changeover valves 47 and 48 establish and interrupt the communication between the pressurized, gas supply source 35 and the gas supply port 45. The changeover valve 53 establishes and interrupts the communication between the vacuum pump 51 and the gas exhaust port 46. With this construction, the gas supply device 43 can switch between supply of high-pressure pressurized gas and supply of low-pressure pressurized gas. The operation of the changeover valves 47 and 48, and 53 is independently controlled by the control means 6 through the respective wirings 54 through 56.

One cycle of filling channel opening and closing control of the filling channel opening and closing device illustrated in FIG. 5 is carried out as follows:

(1) Before Filling

By the direction of the control means 6, the changeover valve 47 places the gas supply port 45 in communication with the pressurized gas supply source 35, the changeover valve 48 closes the passage of the parallel duct 37*b*, and the changeover valve 53 closes the passage of the duct 52. As a result, the gastight compartment 33 in the chamber 8 is pressurized, and the flexible tube 7 collapses under outside pressure (or by external force), thereby closing the filling channel at the flexible tube portion 7.

(2) Start Filling

When another empty container is moved to under the discharge orifice of the filling nozzle 4 and held stationary, the control means 6 directs the changeover valve 47 to close the passage of the parallel duct 37*a* and, at the same time, directs the changeover valve 53 to switch to the vacuum pump 51 side. As a result, the pressure inside the gastight compartment 33 is reduced by the vacuum pump 51, the flexible tube 7 is forcedly opened (the reduced pressure inside the gastight compartment 33 assists in the restoring or expansion of the flexible tube 7), and the filling of the container with the liquid product begins.

(3) Control of Filling

By the direction of the control means 6, the changeover valve 53 closes the passage of the duct 52 and, at the same time, the changeover valve 48 switches to the pressurized gas supply source 35 side. As a result, as shown in FIG. 5, the gastight compartment 33 is again pressurized, and this time to a relatively low pressure, as a result, the flexible tube 7 is collapsed to a certain extent (as illustrated in FIG. 5), the cross-sectional area of the filling channel at the flexible tube portion 7 is decreased, and the velocity and volume of the liquid product flowing through the filling channel are reduced. By way of controlling the velocity and volume of the liquid product flowing through the filling channel in this manner, it is possible to improve the accuracy of filling.

(4) Stop Filling

Upon receiving a signal from a flow meter or other dispensed quantity measuring means, the control means 6 issues a changeover command to the changeover valves 47 and 48. The changeover valve 47 is switched to the pressurized gas supply source 35 side, and the changeover valve 48 closes the passage of the duct 37*b*. As a result, the supply of pressurized gas from the gas supply device 43 is switched from the low pressure to high pressure, the gastight compartment 33 is re-pressurized to a high pressure, the flexible tube 7 collapses, and the filling channel becomes closed completely. Next, the filled container is moved away from under the discharge orifice of the filling nozzle 4.

Figure 6:
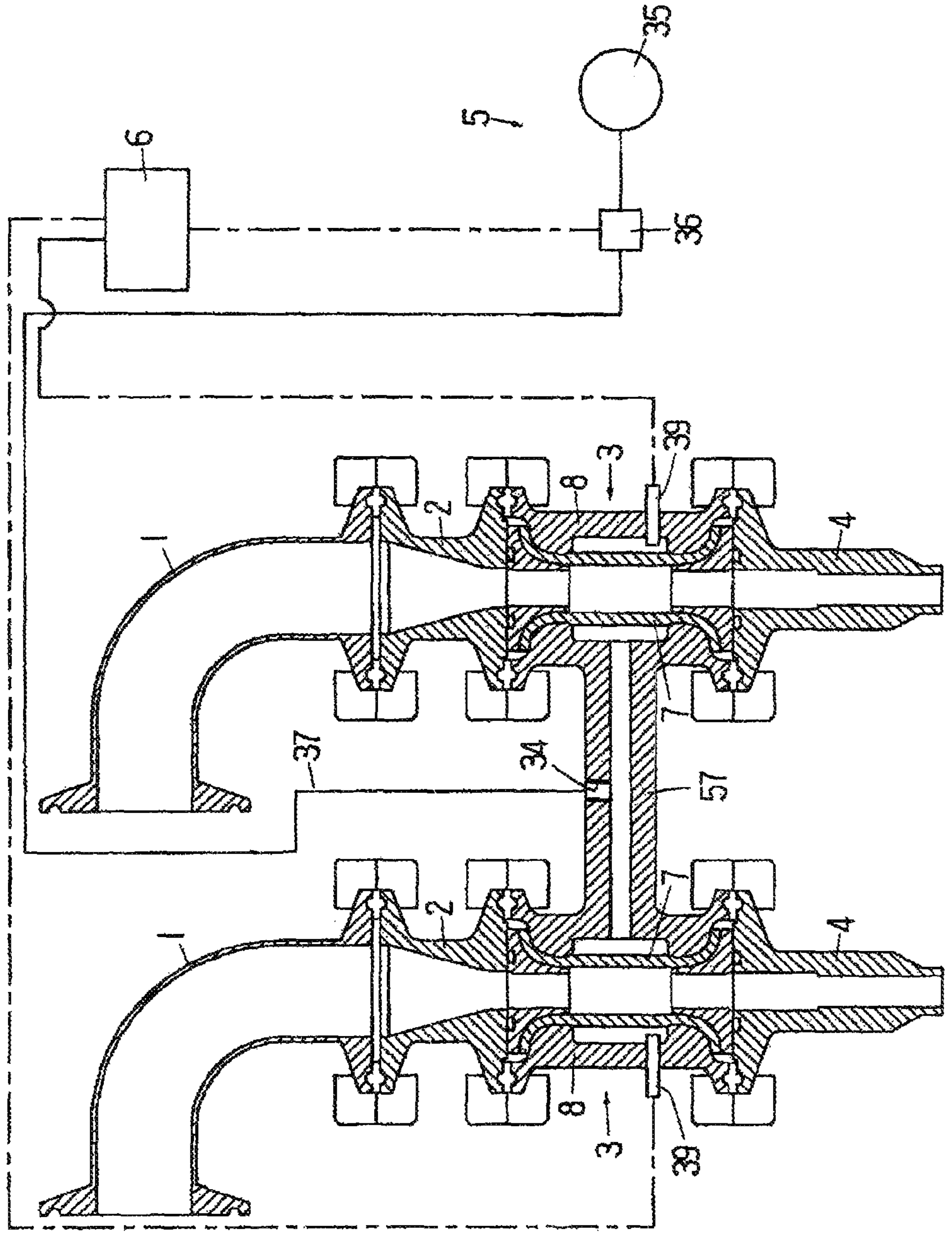
FIG. 6 is a vertical cross-sectional view of still another filling channel opening and closing device according to the present invention.

FIG. 6 illustrates still another liquid product filling apparatus including the filling channel opening and closing device according to the present invention. In FIG. 6, the parts that are substantially identical to the liquid product filling apparatus illustrated in FIG. 1 are assigned the same reference numerals.

The filling channel opening and closing device for a liquid product filling apparatus of FIG. 6 is designed to work with a multi-lane (dual-lane) packaging machine that fills multiple containers at once. This liquid product filling apparatus of FIG. 6 differs from that of the liquid product filling apparatus of FIG. 1 in that it includes two assemblies provided in parallel, and each assembly includes an elbow duct 1, a straight duct 2, a filling channel opening and closing control unit 3, and a filling nozzle 4. The elbow ducts 1 and 1 are provided so as to communication with a shared liquid product storage tank, not shown, either with a filling channel (not shown) in between or without any filling channel in between.

In this filling channel opening and closing device for a liquid product filling apparatus of FIG. 6, a shared gas supply and exhaust means 5 is connected to the two opening and closing control units 3 and 3, which are provided in parallel. In these opening and closing control units 3 and 3, two chambers 8 and 8 are integrally formed, with a connecting conduit 57 interposed therebetween. A gas supply/exhaust port 34 is formed in the connecting conduit 57, and a duct 37, along with a pressurized gas supply source 35 and a changeover valve 36, is connected to this gas supply/exhaust port 34. Detection sensors 39 are 39 are respectively provided in the chambers 8 and 8 of the opening and closing control units 3 and 3.

Though the liquid product filling apparatus has two opening and closing control units 3 and 3, they are controlled simultaneously. In other words, the opening and closing control units 3 and 3 can be controlled (so that the flexible tubes 7 and 7 are opened and closed) simultaneously using a single pressurized gas supply source 35 and a single changeover valve 36, which simplifies the structure of the filling channel opening and closing device. A similar structure can be employed for a type that is designed for three or more lanes of filling channel opening and closing devices.

Figure 7:
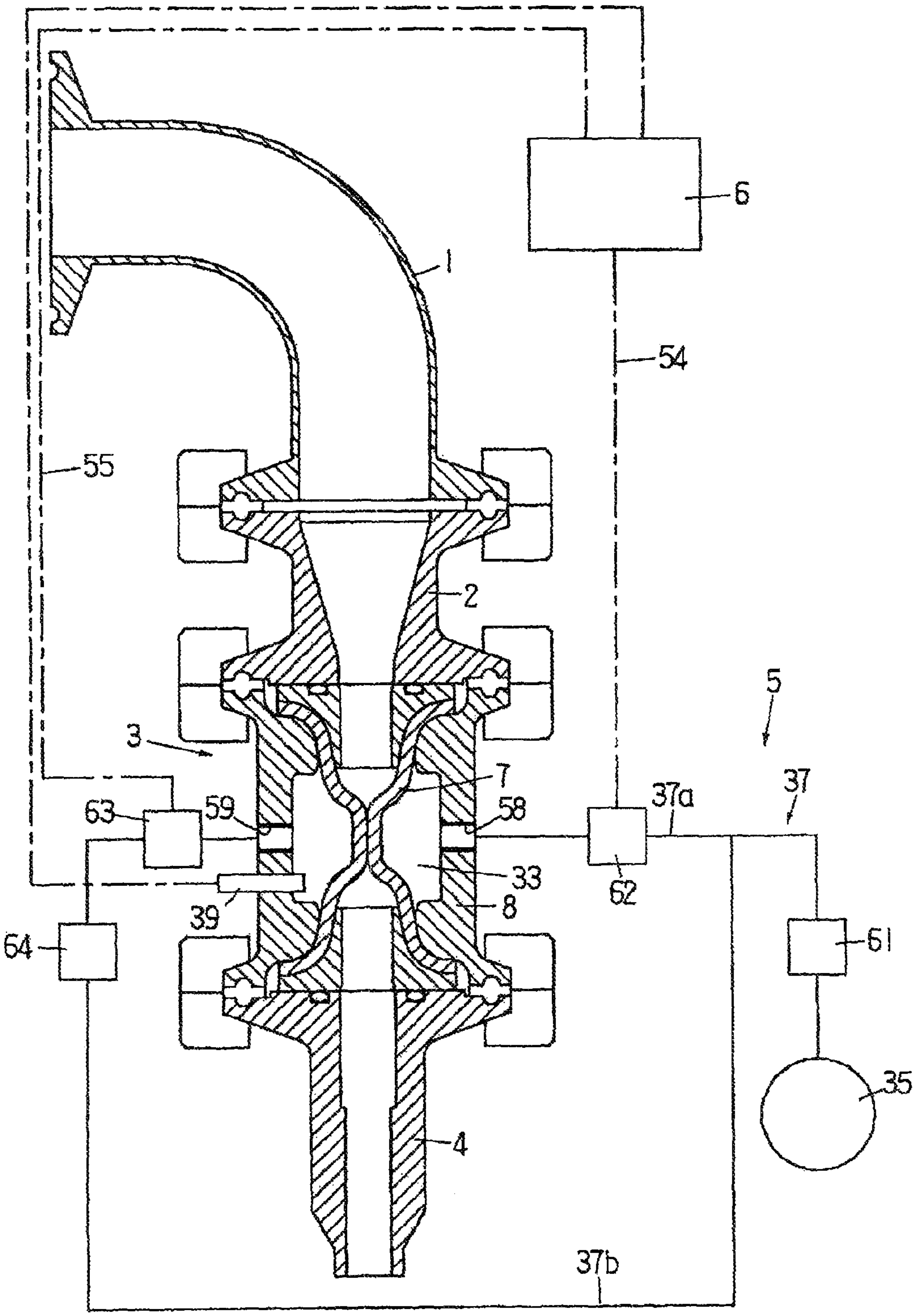
FIG. 7 is a vertical cross-sectional view of a different type of filling channel opening and closing device according to the present invention (during introduction of high-pressure pressurized gas into chamber)

FIG. 7 (as well as FIGS. 8 and 9) illustrates still another liquid product filling apparatus including the filling channel opening and closing device according to the present invention. This liquid product filling apparatus has a suckback feature. In FIG. 7, the parts that are substantially identical to the liquid product filling apparatus illustrated in FIGS. 1 and 5 are assigned the same reference numerals.

In this filling channel opening and closing device for a liquid product filling apparatus of FIG. 7 (and FIGS. 8 and 9), the gas supply and exhaust means 5 is comprised of a pressurized gas supply source 35, ducts 37 (including parallel ducts 37*a* and 37*b*) provided in parallel between the pressurized gas supply source 35 and a gas supply/exhaust port 58 and a gas supply port 59, a pressure regulating valve (pressure reducing valve) 61 installed in the duct 37 on the upstream side of the parallel ducts 37*a* and 37*b*, a changeover valve 62 installed in the parallel duct 37*a*, and a changeover valve 63 and a pressure regulating valve (pressure reducing valve) 64 that are installed in the parallel duct 37*b*. The parallel duct 37*a* is placed in communication with the gas supply/exhaust port 58 while the parallel duct 37*b* is placed in communication with the gas supply port 59. The changeover valve 62 establishes and interrupts the communication between the pressurized gas supply source 35 and the gas supply/exhaust port 58. In addition, it switches the gas supply/exhaust port 58 to the atmosphere for gas release when closed. The changeover valve 63 establishes and interrupts the communication between the pressurized gas supply source 35 and the gas supply port 59. The operation of the changeover valves 62 and 63 is independently controlled by the control means 6 through wirings 54 and 55.

When the changeover valve 63 interrupts the communication between the pressurized gas supply source 35 and gas supply port 59 and the changeover valve 62 places the pressurized gas supply source 35 in communication with the gas supply/exhaust port 58, then high-pressure pressurized gas is supplied into the gastight compartment 33 of the chamber 8. FIG. 7 shows the flexible tube 7 collapsed in this situation. As seen from FIG. 7, the pressure of the high-pressure pressurized gas supplied into the chamber 8 is set to the level at which a tight contact is produced across a wide (vertical) range of the inner peripheral surface of the flexible tube 7.

When, subsequently, the changeover valve 62 interrupts the communication between the pressurized gas supply source 35 and the gas supply/exhaust port 58 and the changeover valve 63 places the pressurized gas supply source 35 in communication with the gas supply port 59, then low-pressure pressurized gas is supplied into the gastight compartment 33 of the chamber 8 instead of the high-pressure pressurized gas. Collapsing variations of the flexible tube 7 at such timings (in the two cases) are illustrated in FIGS. 8 and 9.

Figure 8:
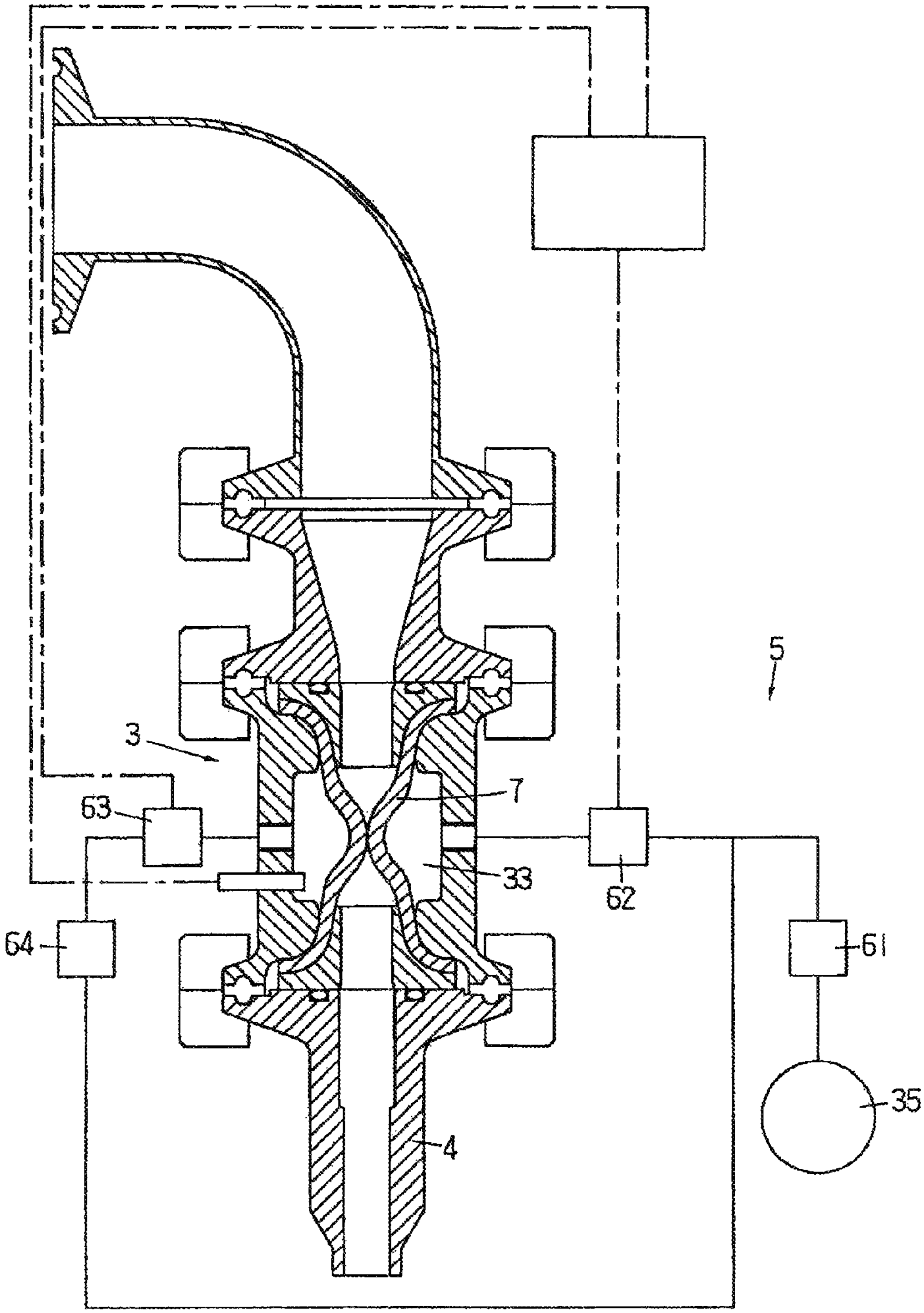
FIG. 8 is a vertical cross-sectional view of the filling channel opening and closing device of FIG. 7 (during introduction of low-pressure pressurized gas into chamber)

In the case of FIG. 8, the pressure of the low-pressure pressurized gas is set to a level at which the flexible tube 7 remains in a collapsed state (so that the filling channel remains in a closed state). In other words, even though the flexible tube 7 does restore, it restores slightly until a balance is achieved between its own resilience and the force of pressure in the gastight compartment 33, and the tight contact of the inner peripheral surfaces of the flexible tube 7 is maintained (although the area of the contact is smaller compared to that shown in FIG. 7).

Figure 9:
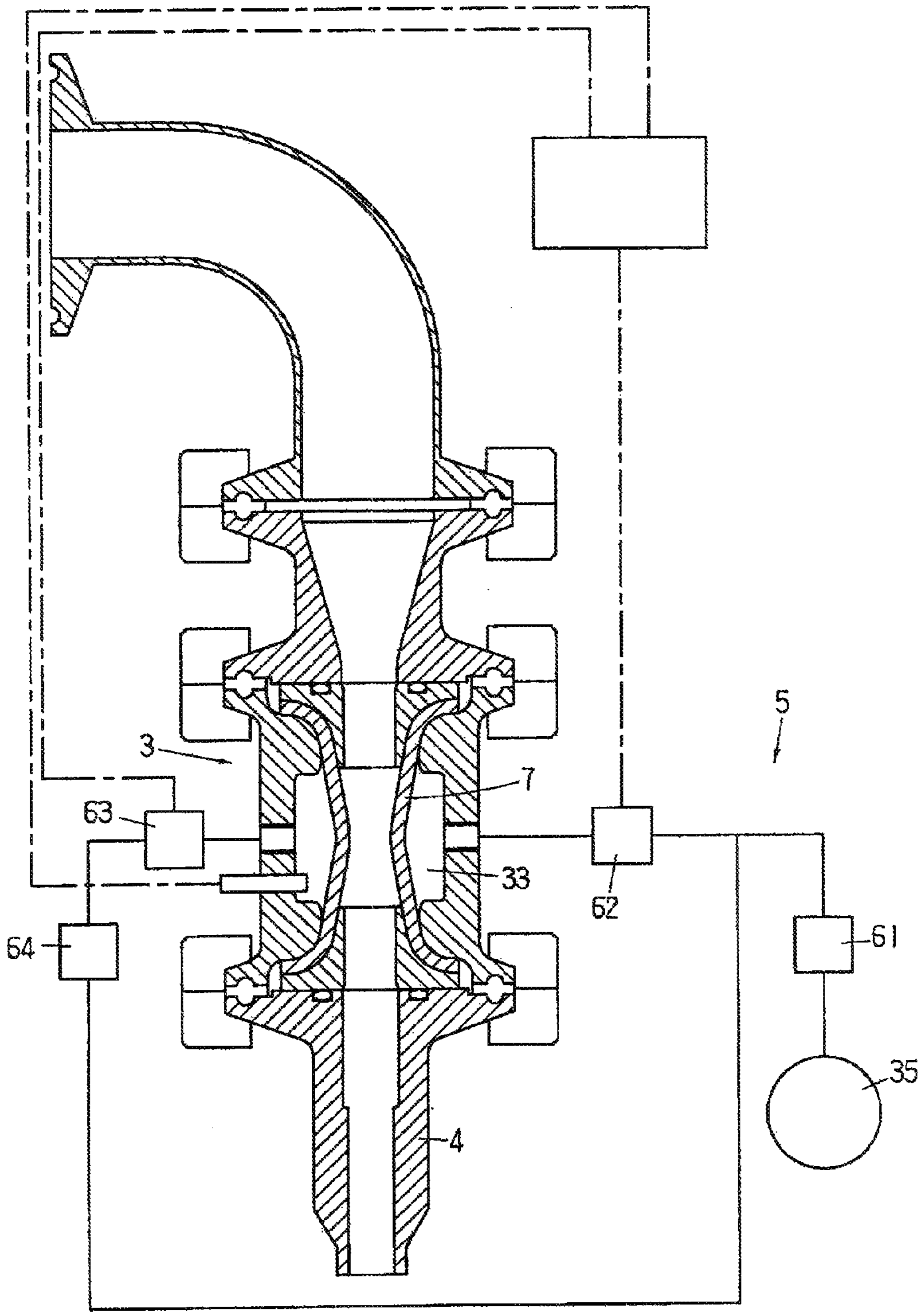
FIG. 9 is a vertical cross-sectional view of the filling channel opening and closing device of FIG. 7 (during introduction of pressurized gas at an even lower pressure)

In the case of FIG. 9, the pressure of the low-pressure pressurized gas is set to a level lower than the level in the case of FIG. 8; and at this level the flexible tube 7 is collapsed not completely (so that the filling channel does not remain in a closed state). In other words, the collapsed flexible tube 7 restores until a balance is achieved between its own resilience and the force of pressure in the gastight compartment 33, so that the filling channel is in an open state to some extent.

In either case described above, the volume inside the flexible tube 7 (the filling channel) is increased in comparison with the case in which the high-pressure pressurized gas is supplied into the gastight compartment 33 which is shown in FIG. 7.

When the pressure of the low-pressure pressurized gas is set to the level employed in the case of FIG. 8, one cycle of filling channel opening and closing control of the filling channel opening and closing device of FIG. 7 is performed as follows for example:

(1) Before Filling

By the direction of the control means 6, the changeover valve 63 places the gas supply port 59 in communication with the pressurized gas supply source 35 and the changeover valve 62 closes the passage of the parallel duct 37*a*, thereby pressurizing the gastight compartment 33 in the chamber 8 to a low pressure determined by the pressure regulating valve 64. As shown in FIG. 8, the pressure inside the gastight compartment 33 maintains the flexible tube 7 in a collapsed state, and the filling channel remains is thus closed.

(2) Start Filling

When another empty container is moved to under the discharge orifice of the filling nozzle 4 and held stationary, the control means 6 directs the changeover valve 63 to close the passage of the parallel duct 37*b* and, at the same time, directs the changeover valve 62 to switch the gas supply/exhaust port 58 to the atmosphere for gas release (while the pressurized gas supply source 35 remains closed). As a result, the gas in the gastight compartment 33 is released into the atmosphere and the flexible tube 7 is caused to restore and expand to its original shape (for example, to the state illustrated in FIG. 1), and the filling of the container with the liquid product begins at the same time.

(3) Stop Filling

At the timing of end of the filling operation (in which the moved container is filled with the liquid product to a predetermined amount), the control means 6 issues a changeover command to the changeover valve 62; the changeover valve 62 places the gas supply/exhaust port 58 in communication with the pressurized gas supply source 35, and the gastight compartment 33 is pressurized to a predetermined high pressure set by the pressure regulating valve 61. As a result, as shown in FIG. 7, the flexible tube 7 collapses, and the filling channel is closed.

(4) Suckback

Next, the filled container is moved away from under the discharge orifice of the filling nozzle 4, and, at an appropriate moment, the control means 6 issues a changeover command to the changeover valves 62 and 63. As a result, the changeover valve 62 closes the passage of the parallel duct 37*a*, and the changeover valve 63 opens the parallel duct 37*b* and places the gas supply port 59 in communication with the pressurized gas supply source 35. Accordingly, the gastight compartment 33 in the chamber 8 is switched from a high pressure level to a low pressure level, and thus, as shown in FIG. 8, the flexible tube 7 restores to expand until a balance is achieved between its own resilience and the force of the pressure in the gastight compartment 33. The collapsed state of the flexible tube 7 and the closed state of the filling channel are maintained. As the flexible tube 7 restores to a certain extent, the volume of the filling channel in the flexible tube 7 expands, and the portion of the filling channel between the flexible tube 7 and the discharge orifice of the filling nozzle 4 is placed under negative pressure. Liquid product at the vicinity of the discharge orifice of the filling nozzle 4 is, as a result, sucked back inside the filling nozzle 4 (the suckback phenomenon), and dripping of the liquid product from the discharge orifice when the filling operation ends is prevented.

On the other hand, when the pressure of the low-pressure pressurized gas in the filling channel opening and closing device illustrated in FIG. 7 is set to the level used in the case of FIG. 9, the filling channel in the flexible tube 7 remains open to some extent in the "Before Filling" step described in (1) above. In addition, when the gastight compartment 33 is switched from a high pressure level to a low pressure level during the suckback operation described in (4) above, the flexible tube 7 restores to expand until such a state is reached that the filling channel remains open to some extent. In this case as well, as the flexible tube 7 restores, the volume of the filling channel in the flexible tube 7 expands, and the portion of the filling channel between the flexible tube 7 and the discharge orifice of the filling nozzle 4 is placed under negative pressure. Liquid product near the discharge orifice of the filling nozzle 4 is, as a result, sucked back inside the filling nozzle 4 (the suckback phenomenon), so that dripping of the liquid product from the discharge orifice when the filling operation ends is prevented.

In the filling channel opening and closing device illustrated in FIG. 7, the expansion of the volume of the filling channel that accompanies the restoring of the flexible tube 7 in the case of FIG. 9 is greater than in the case of FIG. 8, and this is advantageous because the suction force of the suckback is correspondingly stronger. However, since the filling channel in the opening and closing control unit 3 stays open during the suckback operation; the operation of FIG. 9 is used only when no pressure force is applied from the upstream side at the end of the filling operation.

For example, if the filling channel opening and closing device illustrated in FIG. 7 is used in a filling apparatus that uses a measuring pump including a metering cylinder and a piston (as disclosed in, for example, Japanese Patent Application Laid-Open (Kokai) No. H04-201801 and Japanese Utility Model Application Publication (Kokoku) No. H07-2479), at the end of the filling operation, the piston in the metering cylinder reaches the upper dead center position (the endpoint of the forward motion of the piston) and no pressure force is applied to the filling channel of the opening and closing control unit 3. Accordingly, the filling channel opening and closing device of FIG. 7 is able to perform suckback in this filling apparatus.

On the other hand, when it is used in a flow meter-type apparatus or another pressurized filling apparatus in which the pressure of the liquid is constantly applied to the filling channel by a liquid storage tank (as disclosed in, for instance, Japanese Patent Nos. 3704270 and 3454875 and Japanese Patent Application Laid-Open (Kokai) Nos. 2008-94496 and 2009-234633 noted in the above "Related Art" section), a separate filling channel opening and closing device needs to be provided on the upstream side of the opening and closing control unit 3 to prevent application of the upstream side pressure to the filling channel of the opening and closing control unit 3 at the moment when the filling operation ends. Accordingly, for such a flow meter-type apparatus or another pressurized filling apparatus. the filling channel opening and closing device according to the present invention shown in, for example, FIG. 4 or a filling channel opening and closing device of another type can be installed as the upstream filling channel opening and closing device.

In the filling channel opening and closing device shown in FIG. 7, a force of pressure is being applied to the gastight compartment 33 of the chamber 8 during suckback. Accordingly, in comparison with the flexible tube 7B used in the filling channel opening and closing device of FIG. 4, the degree to which the flexible tube 7 restores during suckback is lower, the increase in the volume of the filling channel in the flexible tube 7 is smaller, and the suckback action (suckback force) is weaker. Accordingly, the filling channel opening and closing device of FIG. 7 is suitable for cases in which the diameters of the filling nozzle 4 and flexible tube 7 are relatively small (and the dispensed amount is relatively small) or for cases in which the viscosity of the liquid product that the containers are filled with is relatively low.

Furthermore, in the filling channel opening and closing device of FIG. 7, the parallel duct 37*a* and parallel duct 37*b* can be both connected to the gas supply/exhaust port 58 as shown in FIG. 5. In this case, the gas supply port 59 becomes unnecessary. In addition, the functions of the changeover valve 62 and changeover valve 63 can be switched. In this case, accordingly, the gas supply port 59 acts as a gas supply/exhaust port, and the gas supply/exhaust port 58 acts as a gas supply port. In other words, the changeover valve 63 serves to establish and interrupt the communication between the pressurized gas supply source 35 and the gas supply port 59 and, in addition, to switch the gas supply port 59 to the atmosphere for gas release when closed; and on the other hand, the changeover valve 62 serves to establish and interrupt the communication between the pressurized gas supply source 35 and the gas supply/exhaust port 58; and the release of gas from the gastight compartment 33 into the atmosphere is effected on the parallel duct 37*b* side.

Figure 10:
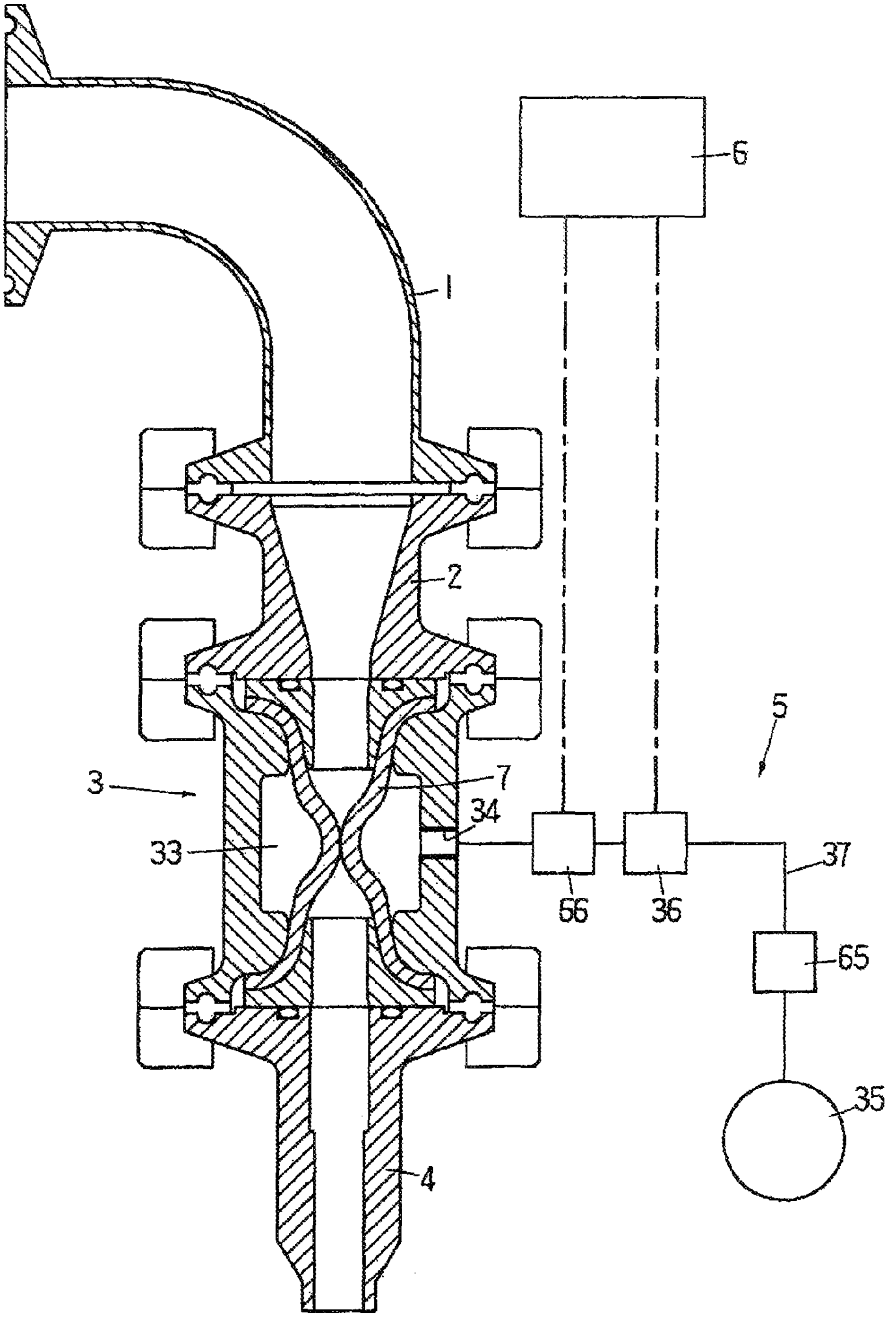
FIG. 10 is vertical cross-sectional view of a further different type of filling channel opening and closing device according to the present invention.

FIG. 10 illustrates another liquid product filling apparatus including the filling channel opening and closing device according to the present invention. This liquid product filling apparatus has a feature to detect the presence of leaks (liquid leakage) in the flexible tube 7. In FIG. 10, the parts that are substantially identical to the liquid product filling apparatus illustrated in FIG. 1 are assigned the same reference numerals.

In this filling channel opening and closing device for a liquid product filling apparatus, the gas supply and exhaust means 5 is comprised of a pressurized gas supply source 35, a pressure regulating valve (pressure reducing valve) 65, a changeover valve 36, a gas flow meter 66, a duct 37, etc. The gas flow meter 66 is installed in the duct 37 between the changeover valve 36 and gas supply/exhaust port 34. The changeover valve 36 switches the gas supply/exhaust port 34 to the pressurized gas supply source 35 side or to the atmosphere for gas release side.

In this liquid product filling apparatus, one cycle of filling channel opening and closing control of the filling channel opening and closing device is carried out as in the same manner as that of the liquid product filling apparatus of FIG. 1.

The gas flow meter 66 measures the flow rate of the pressurized gas in the duct 37 at least when the gas supply/exhaust port 34 and pressurized gas supply source 35 are in communication (when the pressurized gas is supplied into the gastight compartment 33) during the above-described single cycle, and it sends out a measurement signal to the control means 6.

After the flexible tube 7 is collapsed by the pressurized gas, if there are no ruptures or pinholes in the flexible tube 7, then no pressurized gas flow is generated (its flow is stopped) in the duct 37. In such a case, the control means 6 determines that there are no leaks (or no liquid product leakage).

On the other hand, if ruptures or pinholes are formed in the flexible tube 7, then, due to the fact that the pressure of the pressurized gas is higher than the liquid pressure in the flexible tube 7, the gas in the gastight compartment 33 in the chamber 8 penetrates inside the flexible tube 7 and, as a result, a pressurized gas flow is generated inside the duct 37 even after the collapse of the flexible tube 7, and the gas flow meter 66 measures this pressurized gas flow. In this case, the control means 6 determines that there is a leak (liquid product leakage).

As seen from the above, the filling channel opening and closing device is capable of automatic early detection and identification of liquid product leakage due to ruptures or pinholes (or any damage for any reason) in the flexible tube 7, and it stops the operation of the liquid product filling apparatus and/or notifies the operator by generating an audible alert and/or displaying a warning.

The filling channel opening and closing device according to the present invention is not limited to the above-described examples and allows various modifications as described below:

(1) In the above-described examples, the opening and closing control unit 3 is provided directly on the upstream side of the filling nozzle 4. However, it can be installed anywhere as long as it is located within the filling channel between the liquid product storage tank and the discharge orifice of the filling nozzle 4. Nonetheless, it is preferably located in the vicinity of the discharge orifice of the filling nozzle 4 as shown in FIGS. 1 to 10. When two opening and closing control units 3A and 3B are provided in series in the filling channel as shown in FIG. 5, it is preferable to provide at least the downstream side opening and closing control unit 3B in the vicinity of the filling nozzle 4.

(2) In the examples described above, the detection sensor 39 for detecting liquid product leakage is provided in the chamber 8 of the opening and closing control unit 3. However, instead of the detection sensor 39, it is possible to use a chamber 8 that is made of a transparent material, such as acrylic resin, etc., so that the contents of the gastight compartment are visible to allow visual inspection and recognition of liquid product leakage. Fabricating the chamber 8 from a transparent material has the advantage that the operation of the changeover valve 36, etc. can be checked for malfunctions by visually observing the collapse and restoring of the flexible tube 7. It is also possible to provide a detection sensor 39 in addition to use of the transparent chamber 8.

(3) In the structure of FIG. 6, two chambers 8 are integrated into one body by the connecting conduit 57. However, two chambers 8 can be provided independently without using the connecting conduit 57. In this structure, a gas supply/exhaust port is formed in each chamber 8, ducts subsequent to the changeover valve 36 is provided in parallel (divided in two), and each one of them is connected to the gas supply/exhaust port. This structure is able to make the same action as that of FIG. 6.

The invention claimed is:

1. A method for opening and closing a filling channel at a predetermined timing in a liquid product filling apparatus, comprising:

providing a flexible tube in a filling channel between a liquid product storage tank and a discharge orifice of a filling nozzle so as to be part of the filling channel;

providing a filling channel opening and closing control unit that includes said flexible tube and a chamber which encloses said flexible tube in a gastight manner;

connecting a gas supply and exhaust means to said opening and closing control unit, wherein said gas supply and exhaust means collapses and restores said flexible tube by supplying pressurized gas into said chamber and exhausts the gas from said chamber;

exhausting pressurized gas from said chamber when filling of said liquid product is made, thus allowing said flexible tube to restore to open said filling channel, and supplying pressurized gas to said chamber when filling of said liquid product is finished, thus collapsing said flexible tube to close said filling channel, wherein said gas supply and exhaust means switches a pressure of said pressurized gas supplied into said chamber in two levels comprising a first pressure level that closes said filling channel by collapsing said flexible tube and a second pressure level that is lower in pressure than the first pressure level, after supplying the pressurized gas into said chamber at the first pressure level at the end of the filling operation, said gas supply and exhaust means switches over to the second pressure level to prevent said liquid product from dripping from said discharge orifice of said filling nozzle, so that said flexible tube restores from collapsing under the first pressure level until a balance is achieved between the flexible tube and an interior pressure force of said chamber, thus allowing a volume within said flexible tube to expand and suck-back of said liquid thereby preventing said liquid product from dripping from said discharge orifice of said filling nozzle, and a pressure level of the pressurized gas of the second pressure level is set to a level at which said flexible tube is still collapsed and said filling channel is maintained in a closed state;

controlling said gas supply and exhaust means to supply and exhaust gas in and out of the chamber at a predetermined timing.

* * * * *